United States Patent
Busch

(10) Patent No.: US 7,126,327 B1
(45) Date of Patent: Oct. 24, 2006

(54) ASYMMETRICAL AMR WHEATSTONE BRIDGE LAYOUT FOR POSITION SENSOR

(75) Inventor: Nicholas F. Busch, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/187,327

(22) Filed: Jul. 22, 2005

(51) Int. Cl.
G01B 7/30 (2006.01)
G01B 7/14 (2006.01)

(52) U.S. Cl. .......................... 324/207.21; 324/207.25; 324/252

(58) Field of Classification Search ........... 324/207.21, 324/207.25, 252
See application file for complete search history.

(56) References Cited

U.S. PATENT DOCUMENTS

| | | | | | |
|---|---|---|---|---|---|
| 4,712,064 | A | * | 12/1987 | Eckardt et al. | 324/207.21 |
| 5,477,143 | A | * | 12/1995 | Wu | 324/207.21 |
| 5,596,272 | A | * | 1/1997 | Busch | 324/207.21 |
| 5,729,128 | A | * | 3/1998 | Bunyer et al. | 324/202 |
| 5,912,556 | A | * | 6/1999 | Frazee et al. | 324/207.2 |
| 6,404,188 | B1 | * | 6/2002 | Ricks | 324/207.22 |
| 6,469,927 | B1 | * | 10/2002 | Spitzer et al. | 365/173 |
| 6,486,659 | B1 | * | 11/2002 | Schroeder | 324/207.21 |
| 6,538,429 | B1 | * | 3/2003 | Schroeder et al. | 324/207.2 |
| 6,577,123 | B1 | * | 6/2003 | Schroeder et al. | 324/207.24 |
| 6,806,702 | B1 | * | 10/2004 | Lamb et al. | 324/207.25 |

* cited by examiner

Primary Examiner—Reena Aurora
(74) Attorney, Agent, or Firm—Kermit D. Lopez; William B. Shelby

(57) ABSTRACT

A magnetic sensor includes a magnet located proximate to a target comprising a plurality of teeth and a plurality of slots formed therebetween. An integrated circuit is generally located on one side of the magnet wherein the integrated circuit comprises a plurality of asymmetrically arranged magnetoresistive bridge components, wherein the integrated circuit and the magnet are configured into a sensor package, such that the plurality of asymmetrically arranged magnetoresistive bridge components enables a detection of at least one tooth among the plurality of target teeth.

5 Claims, 9 Drawing Sheets

ASYMMETRICAL AMR WHEATSTONE BRIDGE LAYOUT FOR POSITION SENSOR

TECHNICAL FIELD

Embodiments are generally related to position sensors. Embodiments are also related to magnetic sensors and magnetic sensing components. Embodiments additionally are related to magnetoresistive and Hall Effect sensors.

BACKGROUND OF THE INVENTION

Magnetic sensors typically rely upon permanent magnets to detect the presence or absence of a magnetically permeable object within a certain predefined detection zone relative to the sensor. In combination with the permanent magnet, some sensors of this type utilize Hall Effect and/or magnetoresistive components located at particular positions relative to the permanent magnet and other. Magnetoresistive elements, for example, can be disposed at symmetrical positions relative to the permanent magnet in order to implement magnetic sensing operations.

Proximity sensors of this type, whether they use Hall effect elements or magnetoresistive elements, can be configured to sense the presence or absence of a magnetically permeable object passing through a detection zone in a direction generally perpendicular to a central axis of the permanent magnet or, alternatively, can be configured to detect the distance of a magnetically permeable object moving in a direction toward or away from a pole face of the permanent magnet along with a path that is generally parallel to the central axis of the magnet.

One example of a magnetic sensor, which has been implemented, is a temperature stable proximity sensor, which senses magnetic flux emanating from the lateral surface of a permanent magnet. In such a configuration, a ferrous object sensor detects the presence or absence of an object of high magnetic permeability, such as a tooth or a notch on a rotatable mounted ferrous wheel at zero speed and immediately upon power-up.

Such a device can be utilized as a proximity sensor and can be configured with a permanent magnet and a magnetic flux responsive sensor which has a sensing plane and which produces an electrical output signal that varies as a function of the change in magnetic flux density. In such a configuration the ferrous body sensor assembly does not rely upon pole face magnetism as some known conventional sensors do but, instead, relies upon the radial component of magnetic flux density emanating from a lateral surface of the magnet between the opposing pole faces. Since the ferrous object sensor assembly does not rely on pole face magnetism, its electrical output signal is relatively stable over a relatively wide temperature range.

In another magnetic sensor arrangement, a geartooth position and speed sensor can be configured with four magnetic resistance tracks connected in a bridge circuit arrangement. To simplify a field plate effect speed and position sensor, four meander-arranged Permalloy resistance tracks can be located on a substrate at the corners of a rectangle. Such components can be spaced, in the circumferential direction, by approximately half the pitch distance of the teeth of a gear. The resistance can be connected in a voltage divider configuration or in the form of a Wheatstone bridge circuit supplied with a constant current source to eliminate temperature variation effects. In one embodiment, the resistances are formed as meander-shaped thin film vapor deposited tracks on a silicon substrate. A permanent magnet can then be utilized to provide bias magnetization.

In magnetic sensors of the general type described above, a magnetically sensitive component is generally used to provide a signal representing the strength of a magnetic field in a particular direction. If a Hall Effect element is used in association with the permanent magnet, the signal from the Hall element represents the magnetic field strength component in a direction perpendicular to the sensing plane of the Hall device. If, on the other hand, a magnetoresistive element is used in association with the permanent magnet, the signal from the magnetoresistive element represents the magnetic field strength in a direction within the sensing plane of the magnetoresistive element and perpendicular to its thinnest dimension. Depending on the particular application and performance requirements of the sensor, either Hall Effect elements or magnetoresistors can be used. Throughout the literature describing the prior art, sensors of this general type are occasionally described as proximity sensors and alternatively described as geartooth sensors, depending on the intended application of the sensor.

In most proximity sensors, for example, several attributes are advantageous. For example, in a geartooth sensor used in association with an internal combustion engine, an advantageous characteristic is the ability to provide a signal upon startup that identifies the presence or absence of a geartooth in a predefined detection zone without the necessity of gear movement. This is known as a power-up recognition capability. Another advantageous characteristic of a geartooth sensor or a proximity sensor is its reduced size. The size of such a sensor is usually affected by the size of the permanent magnet and the relative positions of the magnetically sensitive component and the permanent magnet.

One example of a magnetic sensing application is disclosed in U.S. Pat. No. 5,477,143, entitled "Sensor With Magnetoresistors Disposed on a Plane Which is Parallel to and Displaced from the Magnetic Axis of a Permanent Magnet," which issued to Mien T. Wu on Dec. 19, 1995, and is assigned to Honeywell International Inc. U.S. Pat. No. 5,477,143 is incorporated herein by reference and generally describes a proximity sensor with two magnetoresistive elements arranged in a common plane and displaced from a lateral surface of a permanent magnet. The common sensing plane of the magnetoresistive elements extends in a direction generally parallel to a magnetic axis of a permanent magnet that extends between the north and south poles of the magnet. In the configuration of U.S. Pat. No. 5,477,143, a detection zone can be defined relative to a pre-selected magnetic pole face and the magnetoresistive elements provide first and second signals that can be compared to define a third signal which is representative of the presence or absence of the magnetically permeable object within the detection zone. The magnetoresistive elements each have a plurality of magnetoresistors, which are arranged in a symmetrical Wheatstone bridge configuration for the purpose of providing the first and second signals described above.

One of the problems with such magnetic detection devices, such as the sensors described above, is that such devices, while adequate for some sensing applications, are typically configured in a symmetrical arrangement of magnetic sensing components, however an asymmetric configuration can often provide enhanced performance. Because, for example, gear tooth sensors can be composed of a permanent magnet and an anisotropic magnetoresistive (AMR) transducer to sense a ferrous or non-ferrous target, the AMR transducer design is critical to the performance of the resulting sensor device or system. Symmetrical arrangements are also sometimes not adequate for sensing nonferrous targets via the well-known eddy current effect. It is believed that one technique for overcoming these deficiencies involves the implementation of an asymmetrical circuit arrangement, rather than a symmetrical configuration.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved position sensor.

It is a further aspect of the present invention to provide for an asymmetrical magnetoresistive bridge for optimizing magnetic detection of a target.

The aforementioned aspects and other objectives and advantages can now be achieved as described herein. A magnetic sensor is disclosed, which includes a magnet located proximate to a target comprising a plurality of teeth and a plurality of slots formed therebetween. An integrated circuit is generally located on one side of the magnet wherein the integrated circuit comprises a plurality of asymmetrically arranged magnetoresistive bridge components, wherein the integrated circuit and the magnet are configured into a sensor package, such that the plurality of asymmetrically arranged magnetoresistive bridge components enables a detection of at least one tooth among the plurality of teeth of the target.

The asymmetrically arranged magnetoresistive bridge components generally comprise an asymmetrical magnetoresistive bridge circuit based on a first set of magnetoresistors asymmetrically offset from a second set of magnetoresistors. The first and second sets of magnetoresistors are configured upon a substrate upon which the integrated circuit is formed. In general, the one set of magnetoresistors comprises a different pattern of magnetoresistors than the other set of magnetoresistors. An improved performance can thus be obtained from the magnetoresistive bridge circuit utilizing such an asymmetrical bridge layout, where the two halves of the circuit are not mirror images of one another. It is important to note, however, that it is not the number of magnetoresistors alone that are utilized to provide asymmetry. For example, the two halves described above can possess the same number of magnetoresistors, but can possess varying spacing between runners thereof.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
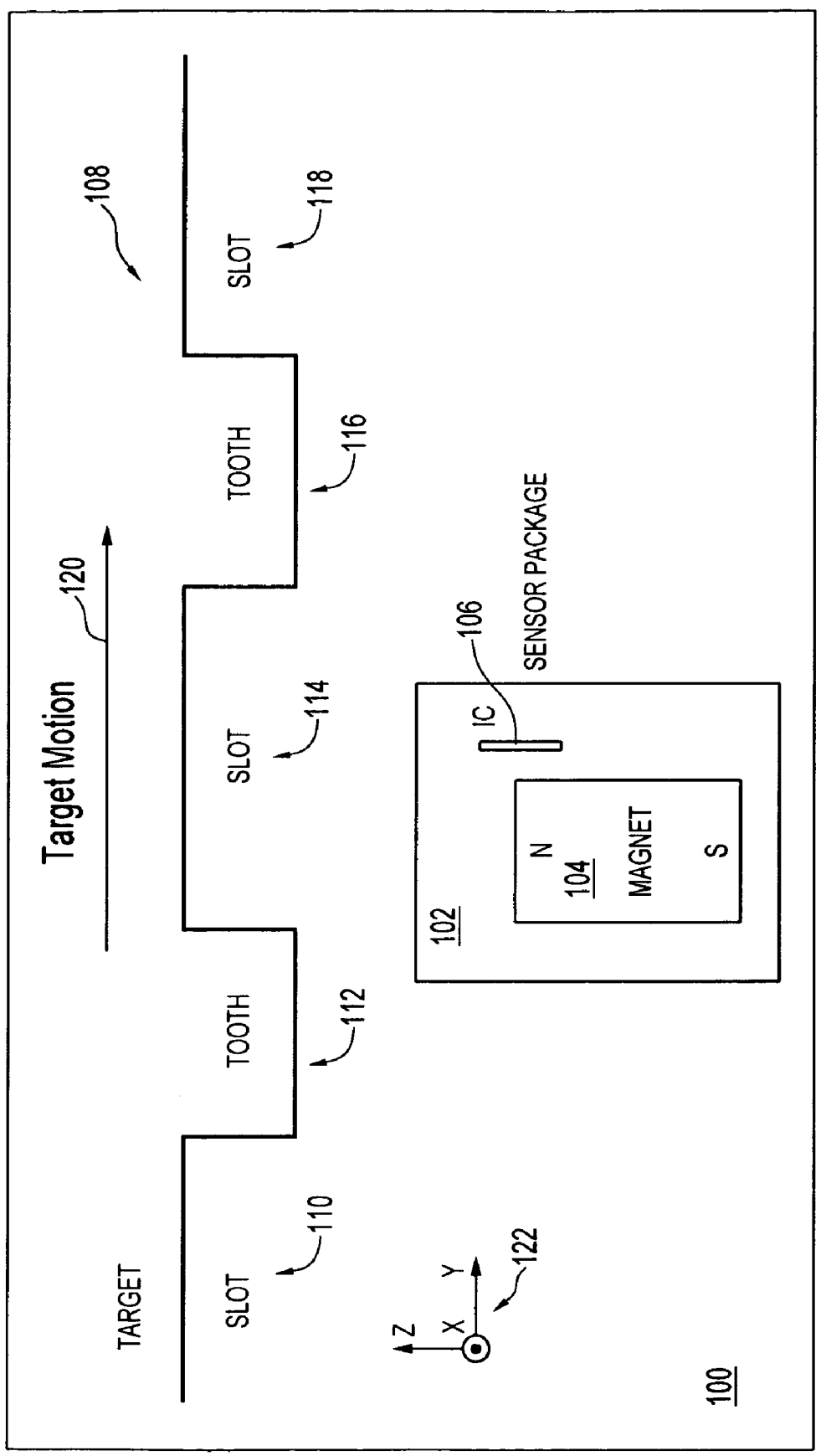
FIG. 1 illustrates an X-axis view of a magnetic sensing system, which can be implemented in accordance with one embodiment.
Figure 2:
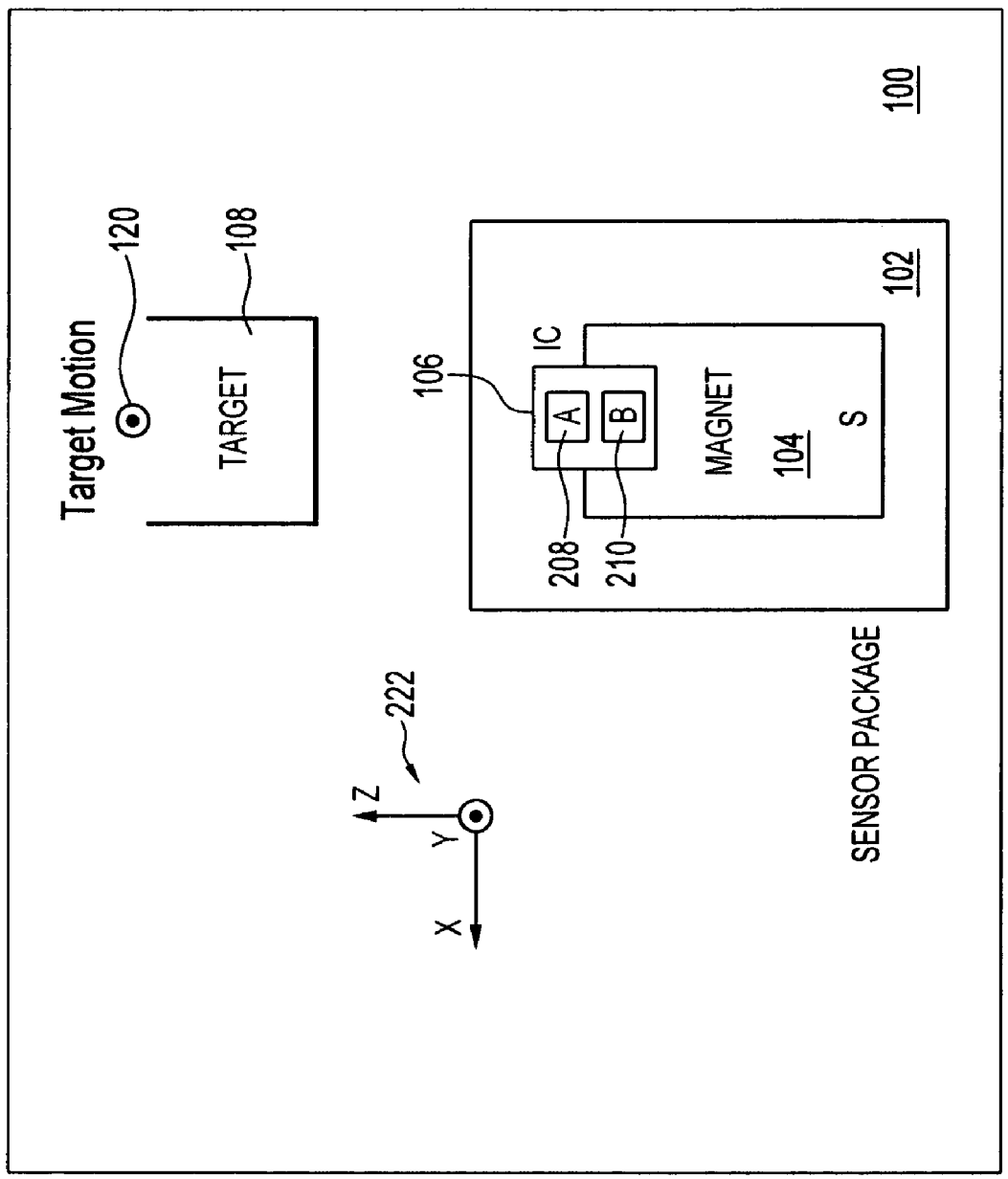
FIG. 2 illustrates a Y-axis view of the magnetic sensing system depicted in FIG. 1 in accordance with one embodiment.

FIG. 1 illustrates an X-axis view of a magnetic sensing system 100, which can be implemented in accordance with an embodiment. Similarly, FIG. 2 illustrates a Y-axis view of the magnetic sensing system 100 depicted in FIG. 1 in accordance with an embodiment. Note that in FIGS. 1–6, identical or similar parts or components are generally indicated by identical reference numerals. Thus, FIGS. 1–6 can be interpreted together in order to describe one or more embodiments.

Magnetic sensing system 100 generally includes a magnet 104 and an integrated circuit (IC) 106 disposed within a sensor package 102. The magnet 104 is generally located proximate to a target 108 that includes a plurality of teeth 112, 116 and a plurality of slots 110, 114, and 118 formed therebetween. The integrated circuit 106 is located on one side of the magnet 106 such that IC 106 includes a group of asymmetrically arranged magnetoresistive bridge components 302, 304, 306, and 308, which are not depicted in FIG. 2, but are shown in greater detail in FIGS. 3, 4, and 6. Note that as utilized herein, the term "bridge" generally refers to a Wheatstone bridge circuit.

The IC 106 and the magnet 104 are configured into sensor package 102, such that the plurality of asymmetrically arranged magnetoresistive bridge components 302, 304, 306, and 308 enable a detection of one or more of teeth 112, 116 of the target 108. Note that in FIG. 1, Z-X-Y coordinates 122 are depicted for perspective purposes, while in FIG. 2, Z-Y-X coordinates 222 are illustrated. Thus, Z-X-Y coordinates 122 relate to the X-axis view of system 100, while Z-Y-X coordinates 222 related to the Y-axis view of system 100.

In FIG. 2, a first region 208 (i.e., region A) is depicted, which is occupied by AMR bridge components 302 and 304. A second region 210 is also depicted in FIG. 2, which is occupied by AMR bridge components 306 and 308. AMR bridge components 302, 304, and 306, 308 can be implemented as AMR bridge resistors, also referred to as AMR runners.

Figure 3:
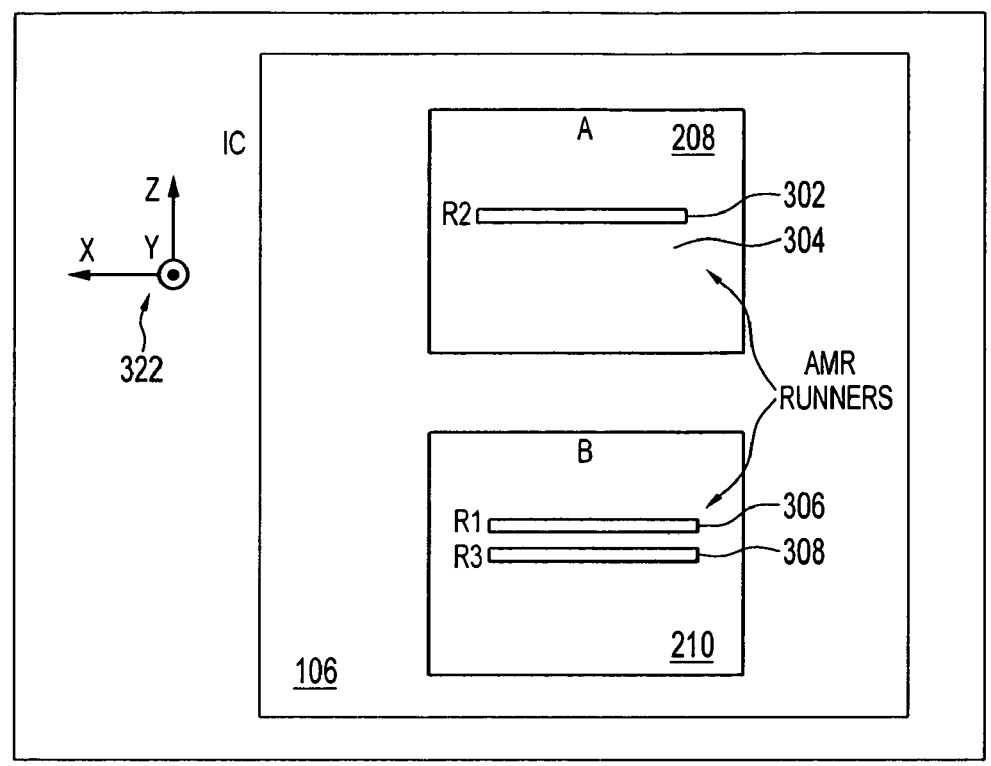
FIG. 3 illustrates a top view of the integrated circuit depicted in FIGS. 1–2 in accordance with one embodiment.

FIG. 3 illustrates a top view of the integrated circuit 106 depicted in FIGS. 1–2 in accordance with an embodiment. Regions 210 and 208 are also depicted in FIG. 3. AMR runners 306, 308 are therefore located within region 210, while AMR runners 302, 304 are located within region 208.

Figure 4:
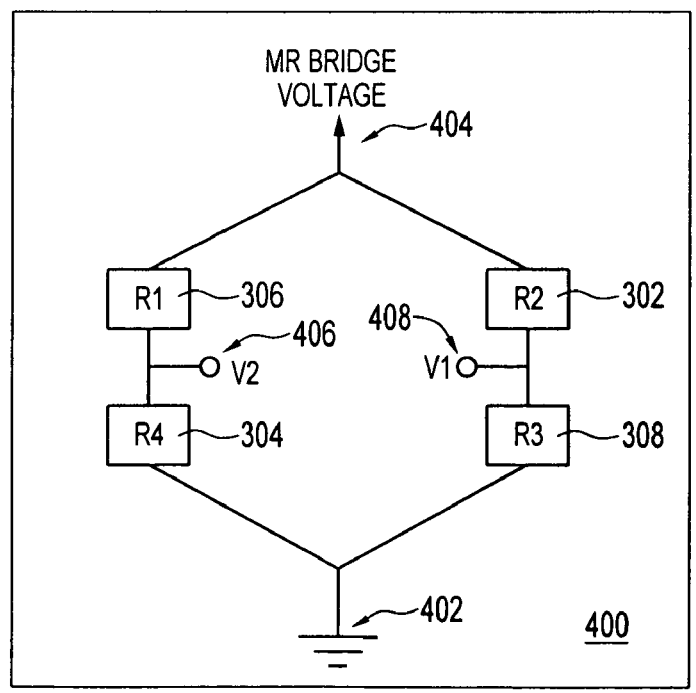
FIG. 4 illustrates an electrical schematic diagram of an AMR bridge circuit that can be implemented in accordance with one embodiment.

FIG. 4 illustrates an electrical schematic diagram of an AMR bridge circuit 400 that can be implemented in accordance with an embodiment. AMR bridge circuit generally comprises AMR resistors or runners 302, 304, 306, and 308. AMR runners 302 and 306 are generally connected to an AMR bridge voltage 404, while AMR runners 304 and 308 are connected to ground 402. AMR runners 304 and 306 are connected to one another at a voltage node 406 (i.e., V2), while AMR runners 302 and 308 are connected to one another a voltage node 408 (i.e., V1).

Figure 5:
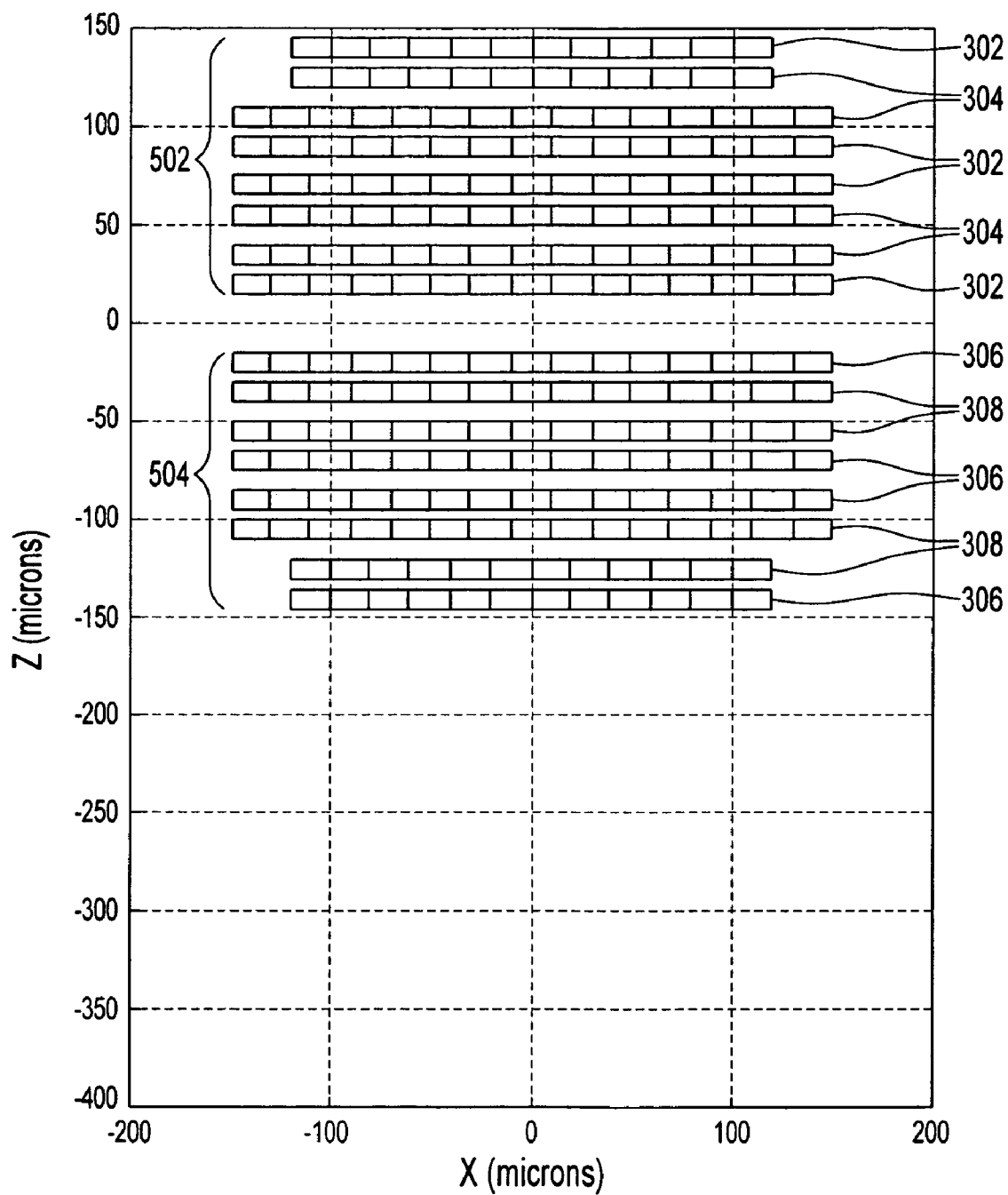
FIG. 5 illustrates a diagram of a symmetrical AMR bridge layout for comparison purposes.

FIG. 5 illustrates a diagram of a symmetrical AMR bridge layout for comparison purposes. The symmetrical AMR bridge layout depicted in FIG. 5 is generally composed of AMR runners, 302, 304, 306 and 308. In FIG. 5, there is essentially two halves of the bridge layout, which are mirror images of one another. The first half is based on a first set 502 of magnetoresistors 302, 304, while the second half is based on a second set 504 of magnetoresistors 306, 308. The symmetrical pattern depicted in FIG. 5, however, is not as useful for sensing ferrous targets or non-ferrous targets via the eddy current effect.

Figure 6:
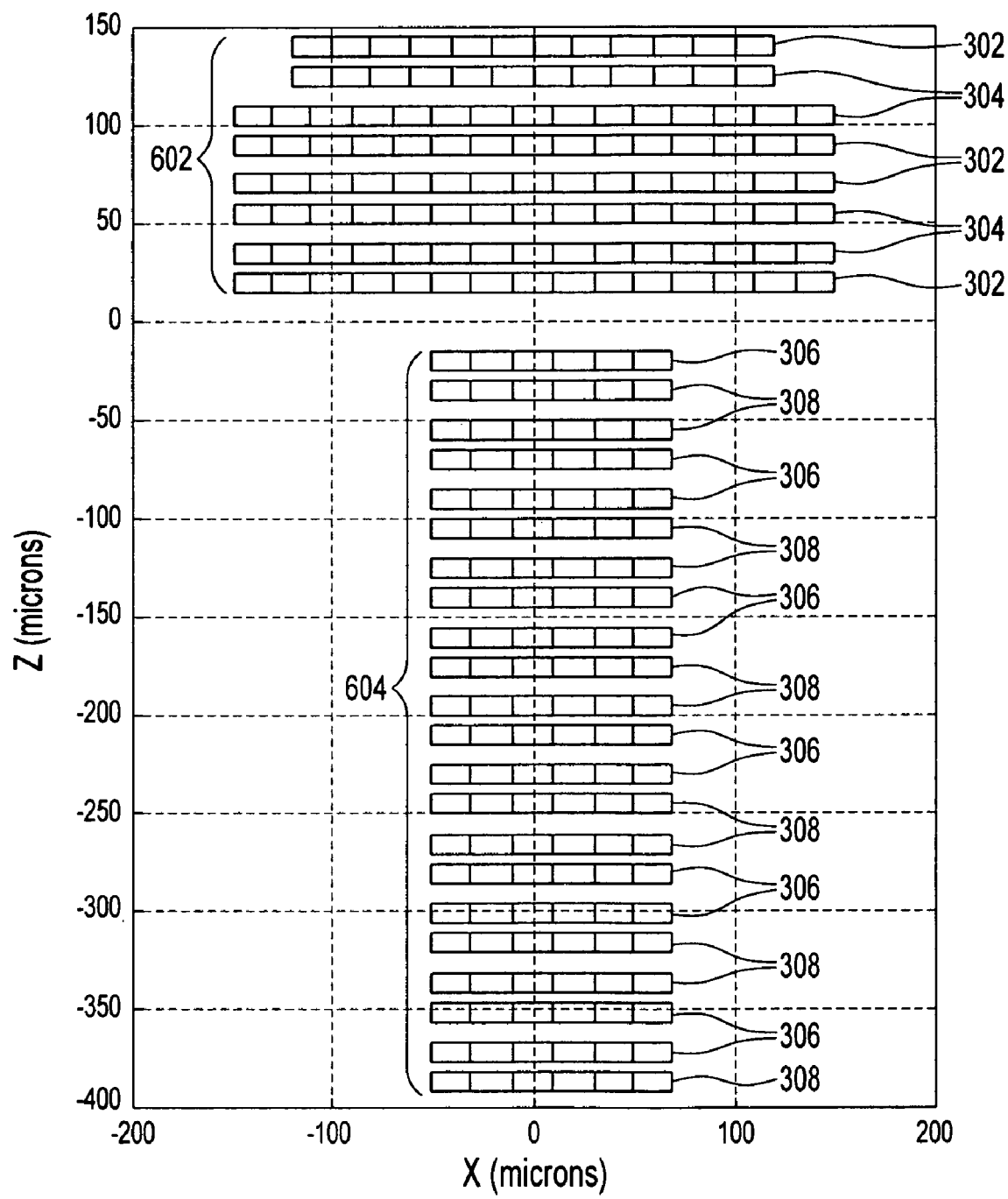
FIG. 6 illustrates a diagram of an asymmetrical AMR bridge layout, which can be implemented in accordance with one embodiment.

FIG. 6, on the other hand, illustrates a diagram of an asymmetrical AMR bridge layout, which can be implemented in accordance with an embodiment. In the configuration depicted in FIG. 6, the AMR bridge dimensions can vary depending on the specific requirements of the sensing application, such as, for example, the allowed sensor package size, magnet dimensions, target dimensions, sensor-to-target specifications and so forth. Note that in FIG. 4, for example, an improved performance can be gained from the AMR bridge circuit 400 via the asymmetrical bridge layout thereof, one example of which is depicted in FIG. 6, wherein the two halves of the circuit are not mirror images of one another.

Based on the foregoing, it can be appreciated that a magnetic sensor package 102 includes magnet 104 located proximate to target 108. The target 108 is formed to include one or more teeth 112, 116 and one or more slots 110, 114, 118 formed therebetween. Note that target 108 can constitute a ferrous target or a non-ferrous target, depending upon design considerations. In the case of using an eddy current effect, the target 108 need not be ferrous as long as it is moving past the sensor package 102 with sufficient speed. In that case, the magnetic field from the magnet 104, moving through the non-ferrous but electrically conductive target 108 (such as aluminum), can induce electrical currents in the target 108, which in turn generate magnetic fields which are sensed by the AMR transducer(s) described herein.

The IC 106 is generally located on one side of magnet 104, wherein the IC 106 comprises a plurality of asymmetrically arranged magnetoresistive bridge components 302, 304, 306, and 308. The IC 106 and the magnet 104 are configured into the sensor package 102, such that the plurality of asymmetrically arranged magnetoresistive bridge components 302, 304, 306, and 308 enables a detection of at least one tooth among the target teeth 112, 116. Note that although only two target teeth 112 and 116 are depicted in FIG. 1, it can be appreciated that many more target teeth can be implemented in accordance with target 108.

The asymmetrically arranged magnetoresistive bridge components 302, 304, 306, and 308 generally comprise an asymmetrical magnetoresistive bridge circuit 400 based on a first set 602 of magnetoresistors 302, 204 asymmetrically offset from a second set 604 of magnetoresistors 306, 308 as depicted in FIG. 6. The first and second sets 602, 604 of magnetoresistors are configured on a substrate upon which the IC 106 is formed. In general, the first set 602 of magnetoresistors comprises a different layout geometry than the second set 604 of magnetoresistors.

Figure 7:
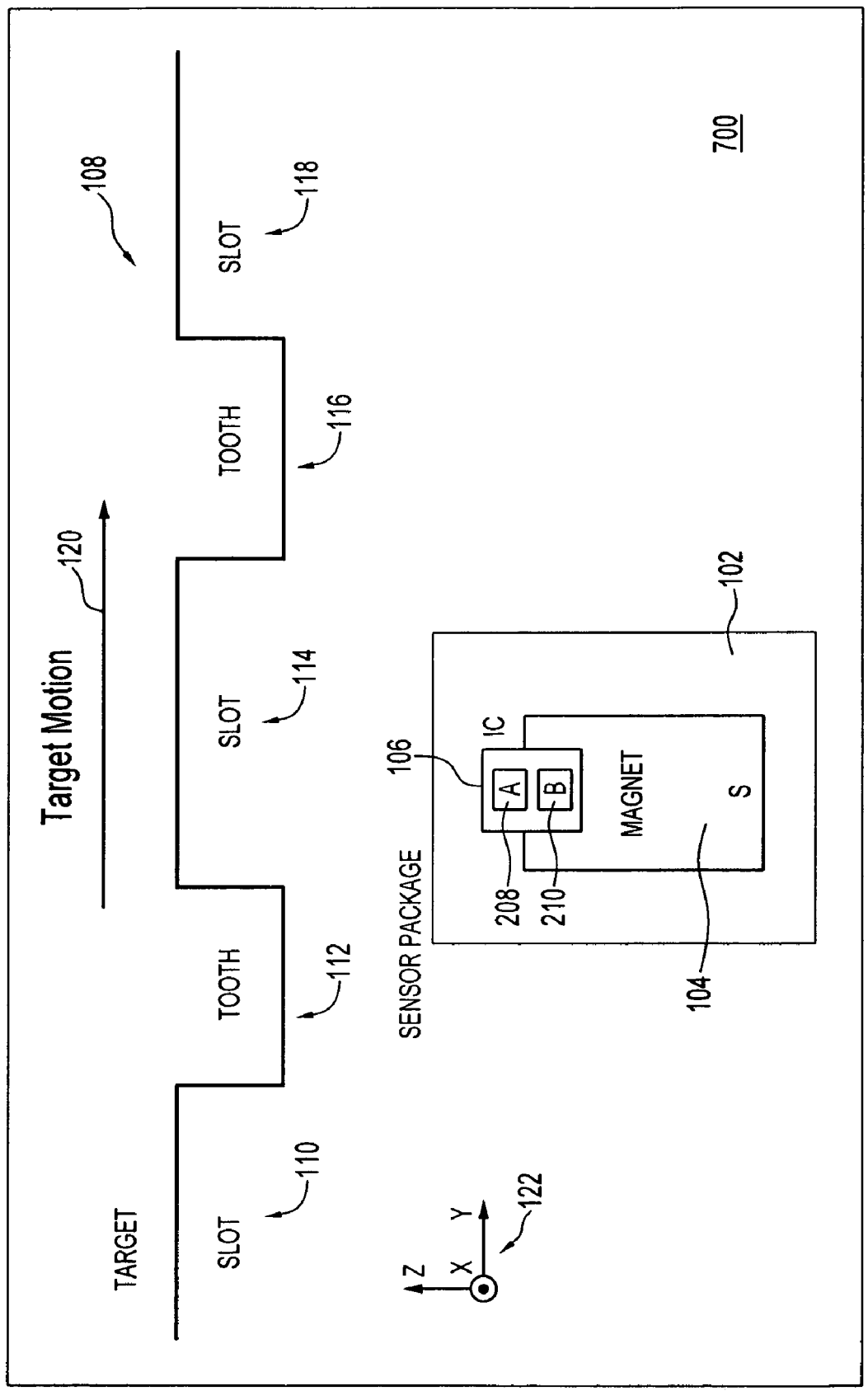
FIG. 7 illustrates an X-axis view of a magnetic sensing system, which can be implemented in accordance with an alternative embodiment.
Figure 8:
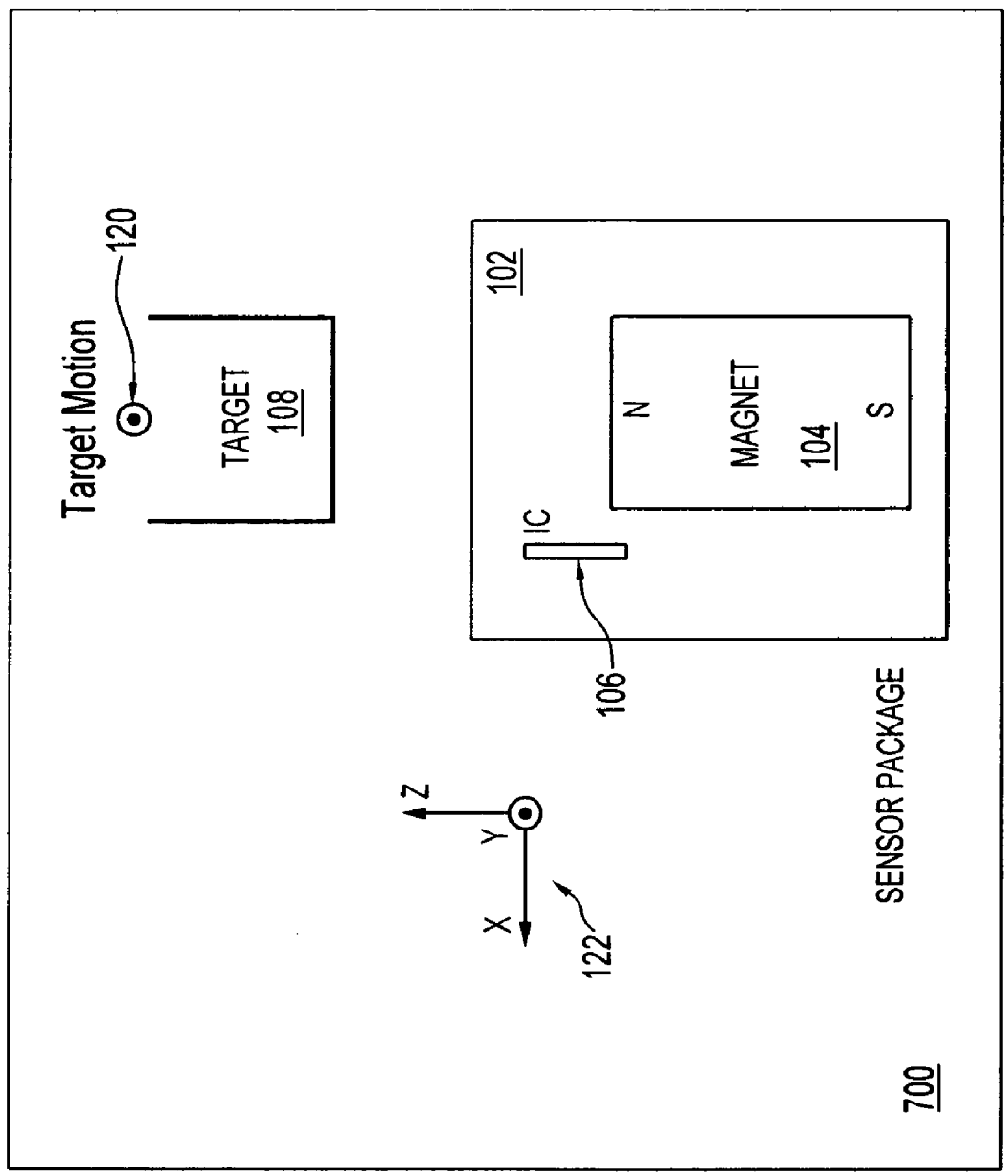
FIG. 8 illustrates a Y-axis view an alternative embodiment.

FIG. 7 illustrates an X-axis view of a magnetic sensing system 700, which can be implemented in accordance with an embodiment. Note that FIGS. 7–8 illustrate a variation to the embodiments depicted in FIGS. 1–6. FIG. 8 illustrates a Y-axis view of the magnetic sensing system depicted in FIG. 7 in accordance with an embodiment. In general, in FIGS. 1–9, identical or similar parts or elements are indicated by identical or similar reference numerals. Thus, system 700 is similar to system 100 depicted in FIGS. 1–6, the difference being that the IC 106 is located to the left of magnet 104.

Figure 9:
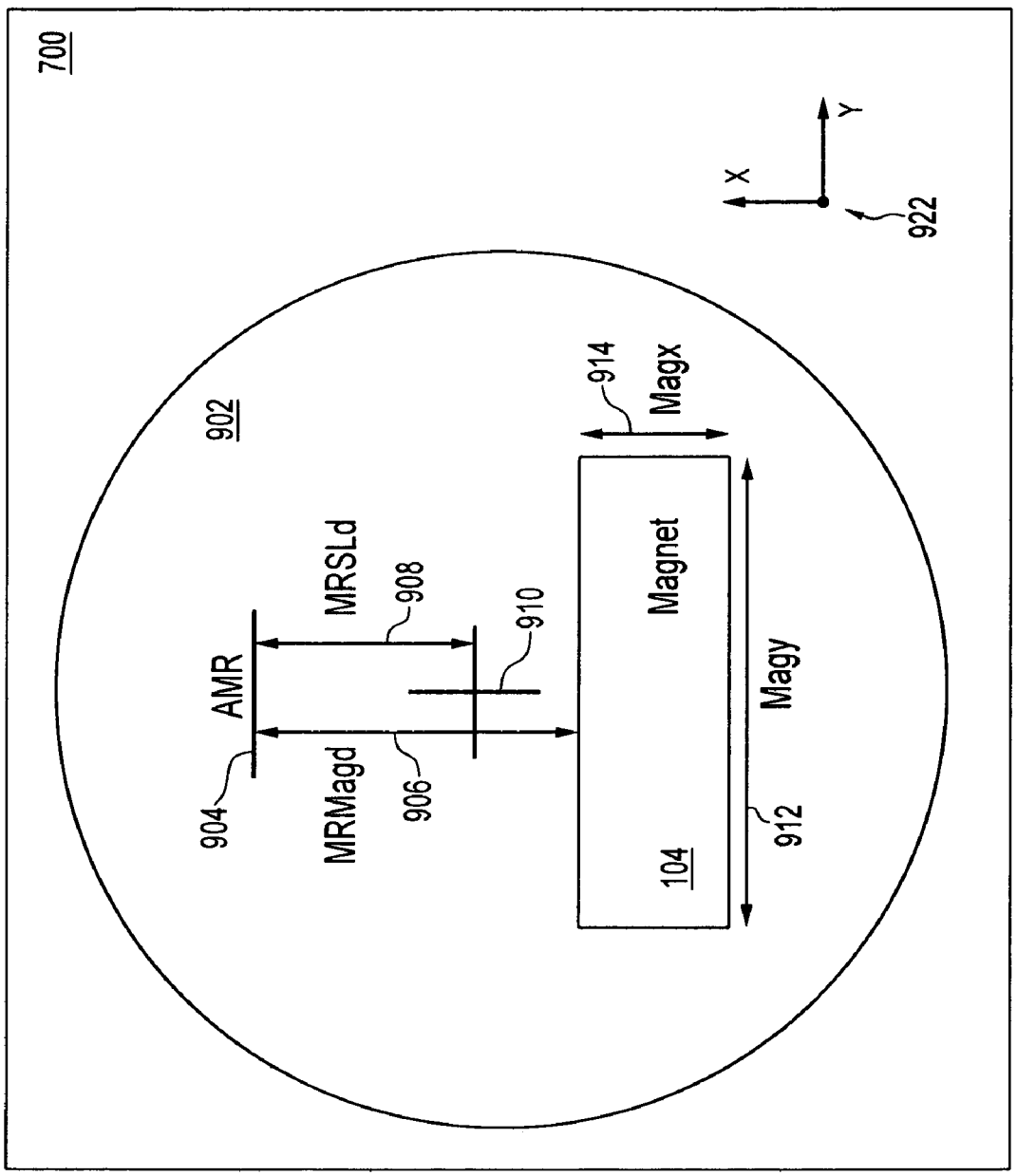
FIG. 9 illustrates an X and Y axis view of the magnetic sensing system depicted in FIGS. 7–8.

FIG. 9 illustrates an X-Y axis view of the magnetic sensing system 700 depicted in FIGS. 7–8 in accordance with an embodiment. In FIG. 9, an AMR component 904 (e.g., AMR bridge circuit 400) is disposed a distance 906 from magnet 104. In general, arrow 908 represents the distance between the center 910 of system 700, while arrow 914 represents the x-distance or width of magnet 104. Similarly, arrow 912 represents the y-distance or length of magnet 104. Note that the area 902 represents the general boundaries of system 700 while the X-Y configuration of system 700 is indicated by X-Y axis 922. Note that the Z-axis is not depicted in FIG. 9 because the illustration of system 900 is only shown with respect to the X-Y plane.

Figure 10:
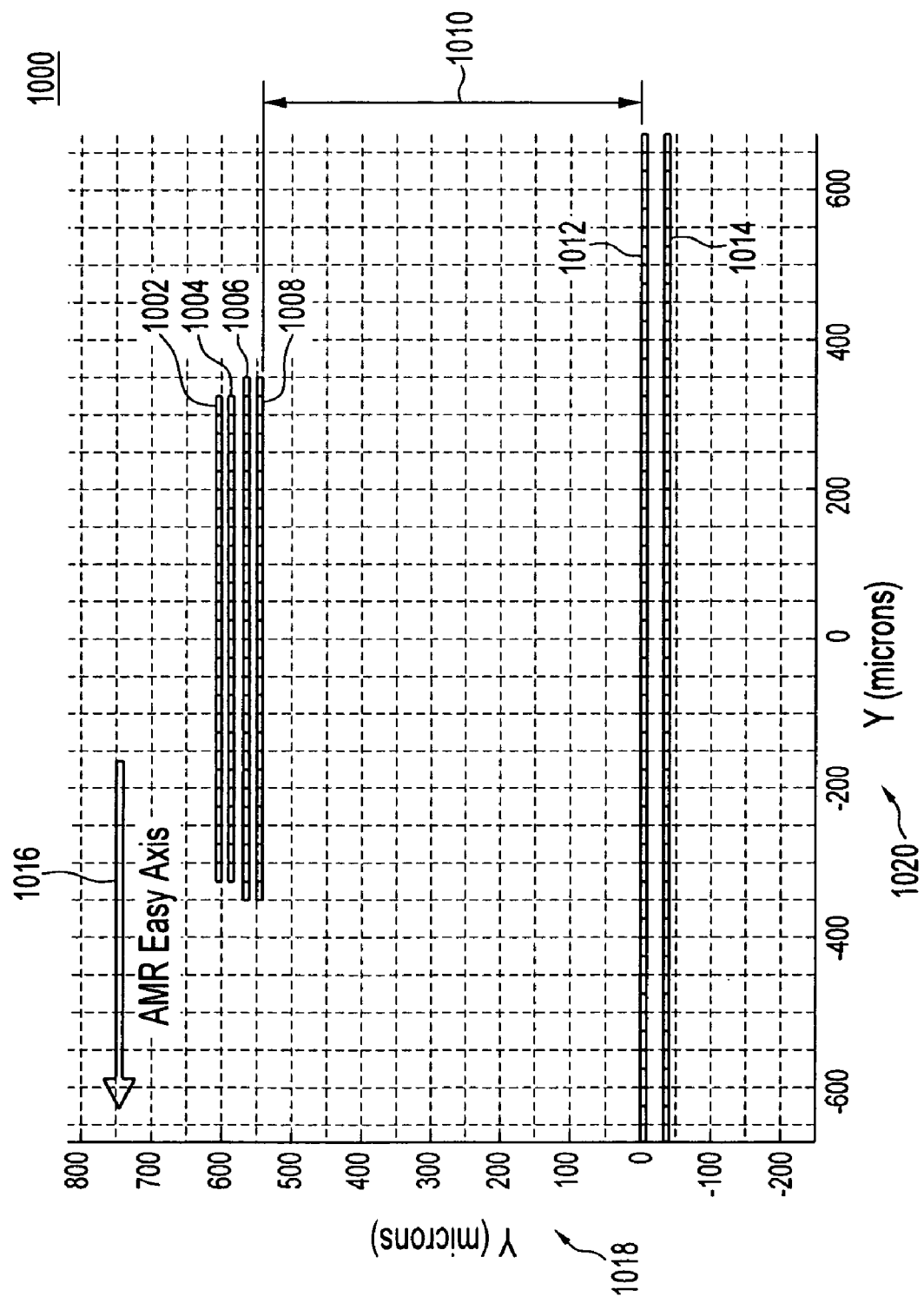
FIG. 10 illustrates of a diagram of an asymmetrical AMR bridge layout, which can be implemented in accordance with a preferred embodiment.

FIG. 10 illustrates of a diagram of an asymmetrical AMR bridge layout 1000, which can be implemented in accordance with a preferred embodiment. In general, the AMR bridge layout 1000 is composed of magnetoresistive components 1002, 1004, 1006, 1008, and 1012 and 1014. The layout 1000 can be implemented, for example, in the context of the configurations depicted in FIGS. 7–8 and FIG. 4. For example, magnetoresistive components 1004 and 1006 can be utilized to implement resistor 304 (i.e., R4) depicted in FIG. 4. Similarly, magnetoresistive components 1002 and 1008 can be adapted for use in implementing resistor 302 (i.e., R2) illustrated in FIG. 4. Likewise, magnetoresistive component 1014 can be utilized to implement resistor 308 (i.e., R3) depicted in FIG. 4, while magnetoresistive component 1012 can implement resistor 306 (i.e., R1) depicted in FIG. 4. Magnetoresistive components 1002, 1004, 1006, 1008, 1012 and 1014 therefore constitute AMR runners.

In the preferred embodiment depicted in FIG. 10, some example runner lengths can be considered. For example, magnetoresistive component or runner 1002 may possess a length of 643 microns, while magnetoresistive component or runner 1008 may possess a length of 700 microns, depending upon design considerations. Spacing between runners 1002, 1004, 1006 and 1008 may be, for example, 10 microns, while the spacing between runners 1012 and 1014 can be 20 microns. The length runner 1012 may be 1343 microns, while each runner 1012 and 1014 may possess a width of 10 microns, again depending upon design considerations. The distance between the edge of runner 1008 and the edge of runner 1012 can be, for example, 540 microns. Suggested AMR film thickness for such runners is 188 Angstrom, while the bridge resistance of such runners can be, for example, 1500 Ohm. The AMR runner widths may be, as indicated earlier, approximately 10 microns. Note that arrow 1016 illustrated in FIG. 10 indicates "AMR Easy Axis". Note that Table 1 below provides some sample data concerning FIG. 9 and the layout 1000 depicted in FIG. 10.

TABLE 1

| Parameter | Value | Units |
|---|---|---|
| MRSLd | 1.30 | mm |
| MRMagd | 3.40 | mm |
| AMR bridge-R2 runner edge to IC edge (toward target) | 30 | microns |
| IC edge to Second Level Package Face (toward target) | 0.83 | mm |
| Approximate calibrated magnet position, distance from second level face | 1.99 | mm |
| Magnet Material | NdFeB | |
| Magnet Material Br | 12600 | Gauss |
| Magnet Material Hc | 11800 | Oersteds |
| MagX | 2.04 | mm |
| MagY | 3.53 | mm |
| MagZ | 5.50 | mm |

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A magnetic sensor, comprising:
   a ferrous target;
   a magnet located proximate to said ferrous target, wherein said ferrous target comprises a plurality of teeth and a plurality of slots formed therebetween;
   an integrated circuit formed on a substrate, wherein said integrated circuit is located on a side of said magnet wherein said integrated circuit comprises a plurality of asymmetrically arranged magnetoresistive bridge components, such that at least one magnetoresistive bridge component of said plurality of asymmetrically arranged magnetoresistive bridge components comprises a different pattern from that of at least one other magnetoresistive bridge component among said plurality of asymmetrically arranged magnetoresistive bridge components, wherein said integrated circuit and said magnet are configured into a sensor package, such that said plurality of asymmetrically arranged magnetoresistive bridge components enables a detection of at least one tooth among said plurality of teeth of said ferrous target; and
   wherein said plurality of asymmetrically arranged magnetoresistive bridge components comprises a first set of magnetoresistors asymmetrically offset from a second set of magnetoresistors wherein said first and second sets of magnetoresistors are configured upon said substrate upon which said integrated circuit is formed and wherein said first set of magnetoresistors comprises a greater number of magnetoresistors than said second set of magnetoresistors.

2. The system of claim 1, wherein said plurality of asymmetrically arranged magnetoresistive bridge components comprises an asymmetrical magnetoresistive bridge circuit.

3. The system of claim 2 wherein said asymmetrical magnetoresistive bridge circuit comprises an AMR circuit wherein said first set of magnetoresistors comprise a first AMR component and a second AMR component and wherein said second set of magnetoresistors comprises a third AMR component and a fourth AMR component.

4. The system of claim 3 wherein said first AMR component is connected to said second AMR component at a second voltage node and said third AMR component is connected to said fourth AMR component at a first voltage node and wherein said first and third AMR components are connected to one another and to a magnetoresistive bridge voltage and said second and fourth AMR components are connected to one another and to a ground.

5. The system of claim 1 wherein said plurality of asymmetrically arranged magnetoresistive bridge components comprise AMR runners.

* * * * *